Patented Dec. 24, 1935

2,025,424

UNITED STATES PATENT OFFICE 2,025,424

TREATMENT FOR BUILDING MATERIALS

Karl Schultz, Chicago, Ill., assignor, by mesne assignments, to Gibb-Lewis Company, Chicago, Ill., a corporation of Illinois No Drawing. Application November 10, 1932, Serial No. 642,063

3 Claims. (Cl. 91—70)

The present invention relates, generally speaking, to a treatment for building materials, and is particularly concerned with a novel method for protecting concrete mixtures and the like against the corroding effects of alkalis and acids. The invention is also concerned with the novel product accomplished by the method, and, broadly stated, with the system for impregnating building materials.

The detrimental corroding and oxidizing influences of moisture, acids and alkalis and the like, on building materials, such as concrete mixtures, and products thereof, and on other building materials, such as stone, wood, and the like, are well known. Industries have, therefore, attempted to find means and ways for protecting such materials and products thereof by either adding to the mixture, as in the case of concrete, substances, such for example, as certain silicates, intended to supply the required fortifying agent during the process of production, or by applying certain surface coatings to the finished products for the purpose of protecting the same against the specific detrimental chemical influences to which they would be subjected during their use.

The results achieved in the past are not entirely satisfactory in spite of certain advances made in the art. Regardless of what the product might be, it will never be subjected to the influences of moisture alone, or the action of acids or alkalis, one to the exclusion of the other. There will always be either concurrent or alternate attacks of a plurality of agents acting on any one product of this class, irrespective whether the same occurs in the form of a building foundation, a base for a machine, or in the form of a floor or wall in an industrial enterprise; as a window sill, a work table in a laboratory, or in any other form. The multitude of uses to which building materials and products thereof are put is too great and only a few can be mentioned in order to recall to mind specific examples.

I am concerned with the general trend of development briefly intimated above, and I have discovered that it is possible to treat building materials, such as concrete mixtures or certain types of natural and artificial stone and other products, so that they will efficiently withstand the effects of moisture, alkalis and also acids, regardless of whether they occur simultaneously or alternately, and irrespective of chemical combinations that might be caused thereby.

My novel method consists in applying to the material either during the production thereof or after finishing the same, for example, to a concrete product, substances in liquid form adapted to combine with the product, to permeate under the surface thereof and to impregnate the same. These substances may be applied to the surface layer in a certain sequence, each serving a specific purpose. The first substance, upon permeating the top layer, forms a protective coat around each particle, for example, sand and cement, of a concrete product. In a certain sense, this may be described as a form of molecular protective treatment. The second substance may then be applied to the product and is adapted to act as an oxidizing agent on the first substance. The third step of the treatment may consist in the application of a substance, in solution, acting to reinforce and to solidify the effect of the previously applied substances. This third step in the process may be compared to the fixation of a light sensitive photographic plate. The molecules and particles of such a plate are being fixed and solidified. In my process, the substance protecting the particles or molecules of the body of material which is being treated is being fixed and solidified within the material and on the surface thereof. An accurate and exhaustive scientific explanation for the action of the various chemical agents cannot be furnished.

A further step may then be added, in the case of certain products, for accomplishing a desired finish and surface texture, and for protecting the surface against mechanical influences. The last mentioned step, which may also consist in the application of a chemical substance in solution, does not alter the reactions of the previously applied substances.

All the chemical components which are used in my method may be soluble in water but will be transformed into insoluble chemically inert compounds by reacting on each other within the body of the building material. Water as a carrier of chemicals combines well with the other ingredients of the building material, such as concrete, and penetrates deeply, supporting the molecular protection mentioned previously.

Numerous advantages are accomplished by my novel method. The protection will be moisture proof, acid proof and also alkali proof. The mechanical strength of the product is not diminished or altered in any way. The product does not carry any odor. This fact is of particular importance in the case of food treating and packing plants and the like. The method also furnishes the possibility of achieving novel effects in the surface finish, which were heretofore impossible in combination with other advantages offered by my invention.

Before entering a detailed description of my novel method, I desire to mention that the application of the various substances may be carried out in many ways. Each solution may be applied by the use of a brush or by dipping the product into a receptacle containing the corresponding solution, or spraying the surface of the product, or impregnating under pressure, in a sealed container, or immersing the material in the solution or in any other suitable and effective manner dictated either by necessity or suggested by choice. It is also possible to apply the first and even the second solution directly to the material while the same is being prepared. The steps of application may be altered according to the nature of the material.

One way of carrying out the invention is specified below with reference to one form of application of the invention to the treatment of a concrete mixture.

Freshly mixed and formed concrete should be allowed to dry thoroughly before it is subjected to the novel protective treatment.

The first solution may then be applied in a suitable way as previously intimated. This solution may contain about fifteen per cent aniline hydro-chloride, forming a salt which is soluble in water. It is, nevertheless, of an oily nature, slipping easily between the cement and sand particles of the material, completely embedding these particles each in a protective coating and filling the minute spaces between the particles. The material may thus be repeatedly treated with this solution. The number of applications will depend on factors, such as the particular material, the density and structure thereof and use to which it is to be put.

The second solution may contain about fifteen percent copper chloride with about five percent acetic acid glacial and about one percent potassium chlorate. It should preferably be applied while the concrete is still somewhat moist after the application of the first solution, and will accomplish the oxidation of the aniline of the first solution within the body of the material and on the surface thereof.

The third solution is applied at boiling hot temperature after the previous impregnation is thoroughly dry. This solution may contain about fifteen percent potassium bichromate and about fifteen percent concentrated sulphuric acid. As was mentioned previously, this third solution reinforces and solidifies the chemical reactions between the first and the second solution.

The surface of the material treated in this manner would then appear dyed by aniline black, which will serve as an indication that the reactions between the substances are completed. The chemical constitution of aniline black is not known scientifically and no further explanation can, therefore, be furnished. I have found, however, that the appearance of the aniline black is indicative of successful completion of the protective reactions. The loose and superfluous particles may be removed from the surface by means of a brush and cold water.

A surface finish consisting of a boiled phenol product, such as known by the trade-mark "Bakelite", treated with a suitable solvent may be applied after some time following the protective impregnation, and the surface may then be polished with a mixture of paraffin and turpentine oil, resulting in a lustrous black coat. This finish does not alter the reactions of the previously applied protective impregnating solutions. The phenol product, by its elastic properties, will furnish excellent protection against mechanical influences acting upon the surface.

In the chemical combinations of this method, the strong bases, namely, aniline, potassium hydroxide, and copper oxide; and the strongest acids known, namely, sulphuric, hydrochloric, chromic and acetic acid glacial, are applied and will cause many complicated reactions. However, they will not disturb each other but will unite into a strong and chemically inert combination which will withstand the corroding effects of alkalis and acids even in concentrated form.

It is understood, of course, that certain substances may be substituted by others to achieve similar results. It is possible, for example, to employ substances such as vanadium chloride, and the like, in place of certain of the substances mentioned previously for accomplishing the required oxidization. The various steps of the procedure may also be altered. It is possible for example to add the first and second solution to the concrete mixture during the preparation thereof. A further modification, particularly in the case of concrete, resides in adding to the concrete mixture, aniline black in powder form, and mixing the same together with the concrete during the preparation thereof. The further treatment would then consist in the impregnation with the third solution and subsequent provision of the elastic surface coat as well as polishing. This modification permits a fairly accurate control of the percentage of aniline black to be added. The procedure adapted will depend on the material to be treated and also on the use to which it is to be put.

My above described novel method furnishes an alkali and acid proof impregnation for building material, such as concrete, plaster, gypsum and the like, also for a great variety of other building materials.

The invention in its scope represents not only a novel method for treating building materials but it also furnishes a novel product which by virtue of the novel treatment, is characterized by many advantageous features.

Concrete and the like may thus be used for the production of novel tiles, which may be painted with any desired color. The surface will be tough and resilient to mechanical influences and will be of a lustrous appearance due to the finishing as explained previously. The surface of the material treated as explained will also exhibit a homogeneous texture. It will be free of sanding, as its surface will be dustproof and elastic instead of brittle and rough, and the surface particles will, therefore, not wear off as is the case with ordinary concrete, and the like. Certain types of natural and artificial stones and other products, such as wood, etc., may also be treated according to my invention. The term building material as used in this description should be understood in its broadest meaning.

The invention will be found useful in a great many instances, for example, in food preparing plants, particularly in dairies where the effects of lactic acid have to be considered; in industrial plants and laboratories; for building and machine foundations, and as general building material, particularly in and around industrial districts where the atmosphere is polluted with gases, such as sulphur dioxide and sulphur trioxide, which are precipitated upon the environment in the form of sulphuric acid when combined with moisture and exerting the well known detrimental corroding effects.

Changes may be made, substances substituted, or the successive steps suitably altered by those experienced in the art. I want to have it understood that I intend to use the invention in all such embodiments as may fall within the scope and meaning of the appended claims in which I have defined what I consider new.

I claim as my invention:

1. The process of treating porous building material for the purpose of making said material acid proof and alkali proof, consisting in applying to said material a solution containing about 15% anilin hydro chloride, of then applying a solution containing about 15% copper chloride, about 5% acetic acid glacial, and about 1% potassium chlorate, and of then applying to said material a solution containing about 15% potassium bichromate and about 15% sulphuric acid.

2. As an article of manufacture, building material made impervious to acids and alkalis by a series of successive treatments comprising the application in sequence of a solution containing approximately 15% analin hydro chloride, then applying a solution containing approximately 15% copper chloride, 5% acetic acid glacial, and 1% potassium chlorate, and then applying a solution containing approximately 15% potassium bichromate and 15% sulphuric acid.

3. As an article of manufacture, building material made impervious to acids and alkalis by a series of successive treatments comprising the application in sequence of a solution containing approximately 15% analin hydro chloride, then applying a solution containing approximately 15% copper chloride, 5% acetic acid glacial, and 1% potassium chlorate, then applying a solution containing approximately 15% potassium bichromate and 15% sulphuric acid, and finally adding an elastic surface coating comprising phenol resin in suspension.

KARL SCHULTZ.